April 13, 1926.
W. H. MURRAY
1,581,010
FISHING TOOL
Filed Dec. 3, 1924
2 Sheets-Sheet 2
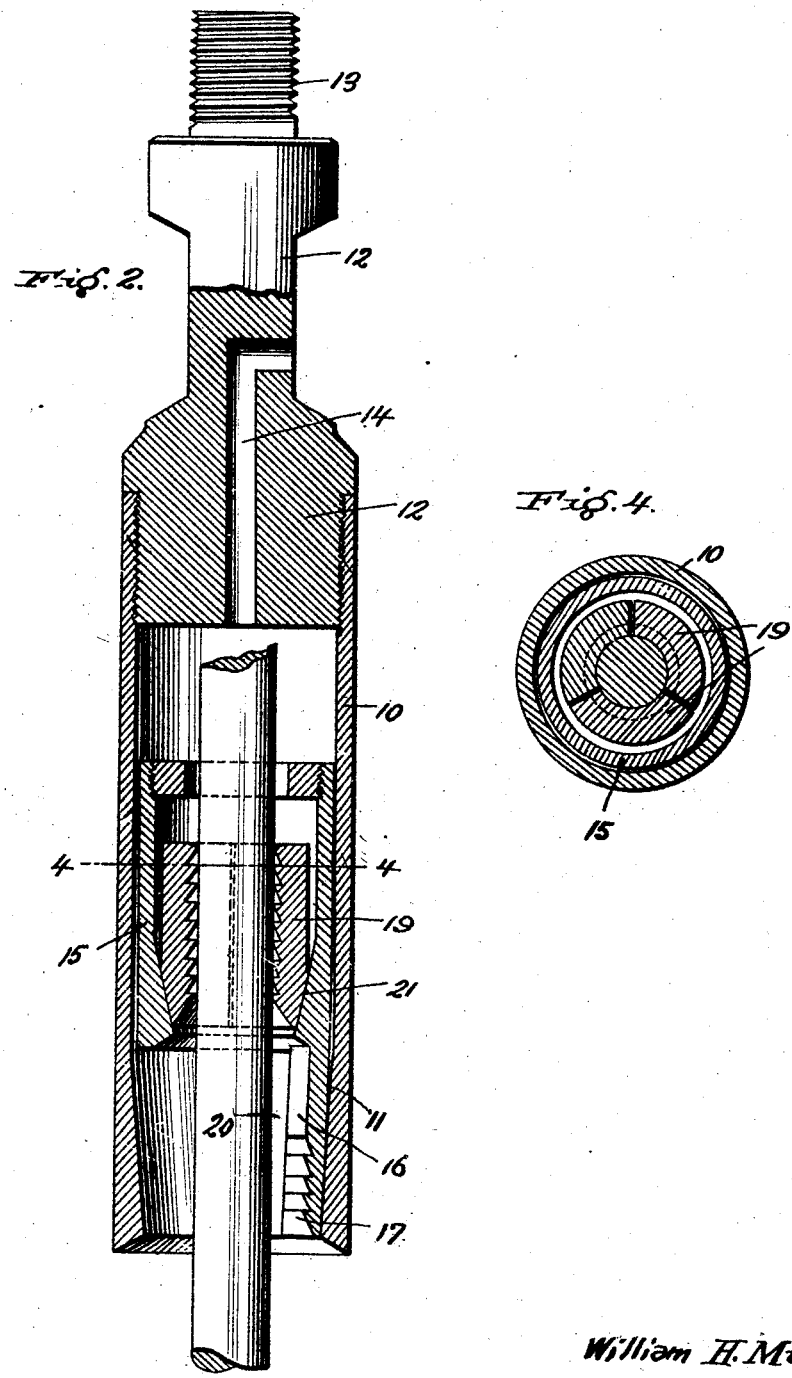
William H. Murray
INVENTOR
By Victor J. Evans
ATTORNEY
WITNESS:

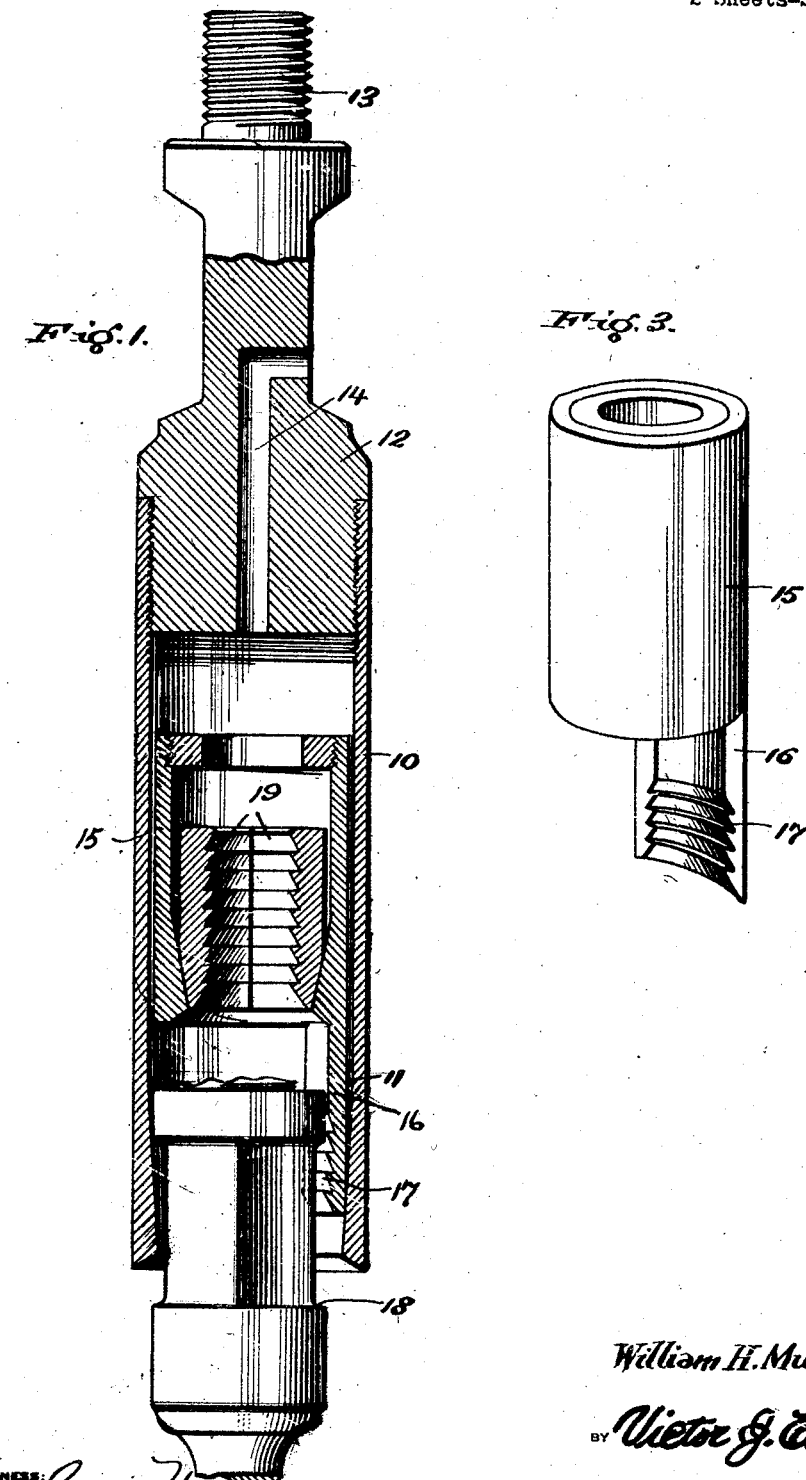

Patented Apr. 13, 1926.

1,581,010

UNITED STATES PATENT OFFICE.

WILLIAM H. MURRAY, OF SHREVEPORT, LOUISIANA, ASSIGNOR OF ONE-HALF TO SUPERIOR IRON WORKS, INC., OF SHREVEPORT, LOUISIANA, A CORPORATION OF LOUISIANA.

FISHING TOOL.

Application filed December 3, 1924. Serial No. 753,723.

*To all whom it may concern:*

Be it known that I, WILLIAM H. MURRAY, a citizen of the United States, residing at Shreveport, in the parish of Caddo and State of Louisiana, have invented new and useful Improvements in Fishing Tools, of which the following is a specification.

This invention relates to fishing tools for removing broken rods and the like from wells, and contemplates a structure which is very effective for the purpose intended, and one which will prevent slipping of the rod to be removed after having once been engaged by the fishing tool.

In carrying out the invention I contemplate the use of a slip mounted for both rocking and sliding movements within a tubular casing, so that when the rod to be removed from the well engages said slip, the latter is rocked and arranged at an inclination to said rod to grip the latter in a way to make it impossible for said rod to separate itself from the tool under any circumstance.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a vertical sectional view through the fishing tool showing how the same is used in conjunction with a broken rod.

Figure 2 is a similar view showing how the tool grips the rod above the joint thereof.

Figure 3 is a perspective view of the slip.

Figure 4 is a sectional view taken on line 4—4 of Figure 2.

The tool forming the subject matter of the present invention comprises a tubular casing 10 which may vary in size, but which is interiorly tapered from an appropriate point in its length toward the lower end thereof as at 11. Screwed into the upper end of this tubular casing is an extension 12 which is threaded as at 13, so that this extension can be screwed into a socket on the lower end of a manipulating rod not shown, but in the ordinary well known manner. The extension 12 is provided with a central bore 14 which opens at one side of the extension, to allow water, dirt or other foreign matter which enters the tubular casing to pass therefrom as will be readily understood.

Arranged to operate within the casing 10 is a slip such as shown in Figure 3, the body portion of which is indicated at 15. Depending from the lower end of this body portion is an extension 16 which is curved to conform to the curvature of the casing 10, and has its inner side serrated or formed with teeth 17, so that it may obtain an effective purchase upon the rod to be removed. The diameter of the body portion 15 is slightly less than the diameter of the tubular casing 10 at a point above the tapered portion 11, so that the slip in its entirety is susceptible of both sliding and tilting movements within the casing 10. It is by reason of this fact that the slip is enabled to take an effective hold upon the rod to be removed, so that slipping of the rod after having been once engaged is prohibited. The normal position of the slip within the tubular casing is perfectly straight, because the slip reposes upon the tapered portion 11. However when the tool is lowered into the well, the rod to be removed enters the lower end of the casing, and should the rod be broken at the joint 18 as shown in Figure 1, this joint contacts the lower end of the body of the slip, moving the latter upwardly within the casing 10. When the slip is moved above the tapered portion 11, it is permitted to tilt so as to occupy the position shown in Figure 1, thus allowing the extension 16 to pass downwardly along the rod, and obtain an effective purchase thereon as shown. Then the tool can be lifted to remove the rod, and it is manifest, the greater the pull upon the rod the more effective the purchase of the slip upon the rod, due to the tapered construction.

As shown in Figure 2, if the rod to be removed is broken above or below the joint 18, the rod is then engaged or gripped by slips 19, which are arranged within the body portion 15 of the slip above described. Manifestly when the slips 19 are used to engage the rod 20, they slide upwardly within the body portion 15 while the tool is being lowered over the rod 20, and then gravitate to take an effective purchase upon the rod, moving over the tapered portion 21 of the body portion 15 of the main slip.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A fishing tool of the character described comprising a tubular casing tapered from an appropriate point in its length toward the lower end thereof, an extension threaded into the upper end of the casing, a slip arranged within the casing and including a tubular body portion having a diameter less than the greatest diameter of the tubular casing, whereby the slip is permitted both sliding and tilting movements within the casing, an extension depending from the lower end of the slip and curved to conform to the curvature of said casing, teeth formed on one side of said extension, the body portion of said slip being tapered toward its lower end, and semi-cylindrical grips arranged within said body portion and normally reposing upon the tapered portion thereof, as and for the purpose specified.

2. A fishing tool comprising a tubular casing tapered from an appropriate point in its length to the lower end thereof, an extension carried by the upper end of said casing and having a longitudinal bore, a slip arranged within the casing and susceptible of both sliding and tilting movements therein, and a plurality of slips arranged to operate within the first mentioned slip.

3. A fishing tool comprising a tubular casing tapered from an appropriate point in its length to the lower end thereof, a slip arranged within the casing and including a body portion susceptible of both sliding and tilting movements within the casing, and normally reposing on the tapered portion thereof, the interior of said body portion being tapered adjacent its lower end, and a plurality of slips arranged within the body portion of the first mentioned slip and correspondingly tapered to cooperate with the taper on said body portion as and for the purpose specified.

In testimony whereof I affix my signature.

WILLIAM H. MURRAY.